United States Patent [19]

Fernyhough

[11] Patent Number: 5,055,314

[45] Date of Patent: Oct. 8, 1991

[54] FILTER AIDE COATING FOR USE IN ALCOHOLIC BEVERAGES

[75] Inventor: Robert Fernyhough, Warrington, United Kingdom

[73] Assignee: Unilever Patent Holdings BV, Rotterdam, Netherlands

[21] Appl. No.: 505,267

[22] Filed: Apr. 6, 1990

[30] Foreign Application Priority Data

Apr. 6, 1989 [GB] United Kingdom ................. 8907813

[51] Int. Cl.⁵ ............................................... C12H 1/04
[52] U.S. Cl. .................................... 426/423; 210/504; 210/506; 423/335; 426/330.4
[58] Field of Search ................ 210/504, 506; 426/423, 426/330.4, 12; 423/335

[56] References Cited

U.S. PATENT DOCUMENTS 1,766,428  6/1930  Cozzolino ........................ 426/330.4
3,158,532  11/1964  Pall ..................................... 210/504
3,958,023  5/1976  Butterworth .................... 426/330.4
4,528,198  7/1985  Mizerak ............................. 426/600
4,766,000  8/1988  Sobus ............................... 426/330.4

FOREIGN PATENT DOCUMENTS 2323487  11/1974  Fed. Rep. of Germany .
 215577  11/1984  Fed. Rep. of Germany ...... 426/423
2454324  11/1980  France .
 366516   9/1957  Switzerland .
 820286   9/1959  United Kingdom .

OTHER PUBLICATIONS

Posada, Brewing Science, vol. 3, pp. 400–411.

*Primary Examiner*—Carolyn Paden
*Attorney, Agent, or Firm*—Cushman, Darby & Cushman

[57] ABSTRACT

Alcoholic beverages are filtered after being stabilized, e.g. with silica hydrogel. Silica hydrogel is usable as a filter aid when blended with 25% to 75% by weight of cellulose. The hydrogel cellulose and blend satisfy requirements for permeability.

8 Claims, No Drawings

FILTER AIDE COATING FOR USE IN ALCOHOLIC BEVERAGES

FIELD OF THE INVENTION

The invention relates to improved filtration aids based on silica hydrogels and their use as pre-coats in filtration systems, particularly those associated with separating solids from fermented beverages.

BACKGROUND TO THE INVENTION

The use of milled silica hydrogels as a total system for both filtering out solids from alcoholic fermented beverages and obtaining chill-haze proof stabilised beverages is well known, and is disclosed by Clark et al; M.B.A.A. meeting Winnipeg 1980 (The Brewer June 1980 p168). This article describes the use of silica hydrogels manufactured to defined specifications as a complete replacement for Kieselguhr and/or Perlite.

The advantages of a total hydrogel filtration system over the traditional one based on Kieselguhr or Perlite apart from its dual performance characteristic are:
(i) the material is less abrasive;
(ii) fine particulate silica hydrogel is non-dusting;
(iii) freedom from using hazardous components; and increased filter cake density which provides
(iv) increased filter cake density which provides increased filter capacity.

The original concept of the total hydrogel system was based on varying the particle size and controlling the particle size distribution of the milled silica hydrogel to produce a range of products that would meet the majority of filtration requirements. An equivalent product to pre-coat grade Kieselguhr and Perlite would have a large particle size (about 40 micron) and a permeability (defined later) of above 0.5 Darcies, whereas a replacement for the body feed-types would be finer (particle size about 15 micron), and have a permeability of 0.1 to 0.3 Darcies. The Clark et al article discusses Darcies as a measure of permeability.

The coarse particle size milled silica hydrogel precoat product has been found to have disadvantages over the traditional filter materials, particularly when used on candle filters. Owing to its much higher particle density of 1.2 kg/liter when compared with Kieselguhr and Perlite, 0.7 and 0.4 kg/liter respectively, the coarser milled silica hydrogel product failed to coat the filter uniformly giving rise to varying pressure drop along the length of the filtration element and the subsequently observed poor filtration performance with respect to running time and clarity of the alcoholic beverage.

The present invention provides improvements in the use of precoated fillers for the treatment of alcoholic beverages. These filters are described in Brewing Science vol. 3 Academic Press Inc. (London) 1987 in particular in chapter 3.6 (J. Posada).

GENERAL DESCRIPTION OF THE INVENTION

It has now been found that a suitable pre-coat for a total milled silica hydrogel filtration system can be obtained by blending cellulose fiber with a milled silica hydrogel with a particle size, and controlled particle size distribution similar to that required for a typical body-feed. Body feed is an insoluble particulate material which is added to the liquor needing clarification, and it has sufficient bed porosity to prevent solid impurities present in the liquor blocking the filtration system. This ensures the impurities do not form a coherent coating which blocks the filter surface. The silica hydrogel will have been milled and classified to provide material of the desired particle size range. Surprisingly, the available porosity of the packed cellulose fiber appears to play an important role in determining its suitability for altering the permeability of the body feed milled hydrogel commensurate with obtaining the required filtration properties. If the packed cellulose fiber is too porous, the milled hydrogel particles block the interstices between the fibers causing a drastic reduction in permeability. On the other hand, the packed cellulose fiber must have the necessary porosity to enable the required filtration performance, in terms of permeability, to be obtained when the fiber is blended into the milled hydrogel at the required level. The use of this blend provides a treatment system for alcoholic beverages based on silica hydrogel as the stabilising agent and filtration medium.

Blended products containing Kieselguhr, cellulose and/or Perlite are well known but they do not have the attributes necessary for a precoat product to be used in the total milled hydrogel filtration system.

The invention proposes the use of a blended product containing cellulose fiber and a silica hydrogel, with a particle size and size distribution associated with a body-feed material, as an effective pre-coat filtration system. The porosity of the packed bed of cellulose fiber is fundamental to obtaining a blended product with the required filtration characteristics with respect to bed permeability.

Accordingly, the invention provides for an effective precoat filtration system comprising a blend of cellulose fiber having a packed porosity equivalent to a permeability of 1.0 to 1.3 Darcies and a silica hydrogel product having a particle size and size distribution commensurate with obtaining a packed bed with a permeability of 0.1 to 0.3 Darcies, preferably 0.2 to 0.3 Darcies, the cellulose fiber content is from about 25% to about 75% weight, preferably from about 30 to about 50% weight. The blended product is non-dusty having a permeability above 0.5 Darcies and an abrasion value with respect to its ability to scratch perspex of not greater than 10.

An essential feature of the invention is that the filter cake density of the blended product is in the range from about 0.3, preferably from about 0.4, to about 0.6 kg/liter.

The silica hydrogel has a surface area S(BET) to nitrogen of from about 200, preferably from about 400, to about 1100 $m^2/g$ and a silica content from about 25 to about 45% by weight, preferably from about 30 to about 39% weight.

The cellulose fiber is a alpha-cellulose free from lignin, hemi-cellulose consisting of 1,4 beta-glycosidic connected D-glucose molecules of the formula $(C_6H_{10}O_5)_n$, where n is at least 500. The use of food grade alpha cellulose provides the necessary standard of blend to be obtained commensurate with a food application.

The blend of milled hydrogel and cellulose fiber is usually dispersed in water and/or alcoholic beverage at a concentration commensurate with obtaining the required usage level of 0.5 to 1.0 $kg/m^2$, and then passed around the filter until a clear filtrate is treated with the required be stabilised and filtered is treated with the required amount of milled silica hydrogel (a commerically used stabilising agent), having a particle size and size distribution usually associated with body feed, and passed through a pre-coated filter of the invention until the filtration rate is considered to be uneconomic and/or the quality of the alcoholic beverage is not acceptable. The blend may be obtained by any physical mixing procedure but comilling of the components is a preferred route to obtaining an intimate mixing of the blend.

Filter cakes formed using the blended product of the invention can be disposed of, other than by dumping, by a two-stage process. The silica fraction can be removed by dissolving in dilute NaOH solution (2-4%); thus apparatus can be cleaned while in position in the brewery. The cellulose fraction is insoluble in alkali but can be recovered and destroyed by burning leaving virtually no ash.

The hydrogel/cellulose blend of the invention may be mixed with other filter aids, e.g. Kieselguhr, to form a mixed layer. It is also usable with other filter aids by being deposited on the filter support in layers.

TEST PROCEDURES (i) Permeability

The permeability of a material is found by application of Darcies Law which describes the flow of a liquid in cake filtration assuming it to be a laminar flow process.

$$K = \frac{Q \cdot H \cdot u}{A \cdot DP}$$

K = Permeability in Darcies.
Q = Flow rate through bed (mls/sec).
H = Bed Depth (cms).
*u = Viscosity mpas.
*A = Cross sectional area of tube (cm$^2$).
*DP = Pressure differential across bed (atmos).
*For a given apparatus these parameters are constants.
Therefore $$K = \frac{Q \times H}{F}$$

Where F is a constant derived from the apparatus. The apparatus used is that described by Scriban and Benard in The Brewers Digest July 1977 pp38 et seq.

Into a clean 250 mls beaker 100 g of distilled water is added following by 20 g of the material to be tested. A laboratory mixer pre-set at 500 rpm is then lowered into the slurry, switched on and allowed to run for 5 minutes.

A filter disc (Seitz o/400a) is placed in the column with the uneven side up and the column assembled. The dispersion is then poured into the filter column and any residue is washed out using a wash bottle.

The filter column is attached to an air line governed to a pressure of 20 psi and levelled by means of a spirit level. On attaining a horizontal platform the air is turned on forcing the water from the column forming a filter cake. It is important once the water is expelled to turn-off the air supply and remove the column from the air line.

The filtrate is then returned to the column which is topped up using fresh distilled water to the original volume.

The column is re-connected to the air-line and the water column subjected to a pressure of 20 psi. Over time periods of 15 seconds, usually with one minute between the measurements the volume expelled is carefully measured.

The column is removed from the air line and the filter cake examined for cracks or blow-holes. If present, the test must be repeated to obtain meaningful results. The two volumes of water collected should be the same within one to two mls and an average volume is used in the calculation of permeability.

(ii) Cake Density

When the permeability measurement is complete the filter cake thickness is determined using a graduated dip-stick. The filter cake is then weighed and the cake density calculated.

(iii) Weight Mean Particle Size

The weight mean particle size of the milled silica hydrogels was determined with the aid of a Malvern Particle sizer, Model 3600E. This instrument made by Malvern Instruments, Malvern, Worcestershire uses the principle of Frauhoffer diffraction utilising a low power He/Ne laser. Before measurement the sample was dispersed ultrasonically in water for a period of 7 minutes to form a homogeneous aqueous suspension.

(iv) Surface Area

Surface area of milled hydrogel is determined using standard nitrogen adsorption methods of Brunauer, Emmett and Teller (BET) using a single point method with a Sorpty 1750 apparatus supplied by Carlo Erba company of Italy. The sample was first outgassed under vacuum at ambient temperature overnight and then heated under vacuum at 270° C. for one hour before measurement.

(v) Perspex Abrasion Value

This test is based upon a toothbrush head brushing a perspex plate in contact with a suspension of the test material in a sorbitol/glycerol mixture. Normally the slurry composition is as follows:

Test Material 2.5 grams
Glycerol 10.0 grams
Sorbitol Syrup 23.0 grams

All components are weighed into a beaker and dispersed for 2 minutes at 1500 rpm using a simple stirrer. A 110 mm × 55 mm × 3 mm sheet of standard clear Perspex is used for the test, supplied by Imperial Chemical Industries Plc under code 000.

The test is carried out using a modified Paint Wet Scrub Tester produced by Research Equipment Limited, Wellington Road, Hampton Hill, Middlesex. The modification is to change the holder to fit a toothbrush head. In addition a weight of 14 ozs is attached to the brush to force the brush onto the perspex plate.

A Galvanometer is calibrated using a 45° Plaspec gloss head detector and a standard (50% gloss) reflecting plate. The Galvanometer reading is adjusted to a value of 50 under these conditions. The reading of the fresh perspex plate is then carried out using the same reflectance arrangement.

The fresh piece of perspex is then fitted into a holder Two mls of the dispersion, sufficient to lubricate fully the brushing stroke, is placed on the plate and the brush head lowered onto the plate.

The machine is switched on and the plate subjected to three hundred strokes of the weighted brush head. The plate is removed from the holder and all the suspension is washed off. It is then dried and re-measured for its gloss value. The abrasion value is the difference between the unabraded value and the value after abrasion. This test procedure, when applied to known abrasives, give the following values:

|  | Perspex Abrasion Value |
| --- | --- |
| Calcium carbonate (15 Micron) | 32 |
| Silica xerogel (10 micron) prepared by UK 1264292 method | 25 |
| Alumina trihydrate (Gibbsite) (15 micron) | 16 |
| Calcium pyrophosphate (10 micron) | 14 |
| Dicalcium phosphate dihydrate (15 micron) | 7 |

SPECIFIC DESCRIPTION OF THE INVENTION

The invention is further illustrated but not limited by the following examples in which parts and percentages are by weight, unless otherwise indicated.

In all the examples the milled silica hydrogel was prepared from base silica hydrogel. The latter was prepared by mixing 40% w/w sulphuric acid with sodium silicate (mol ratio 3.3:1; $SiO_2:Na_2O$) containing 25% w/w $SiO_2$ in the reactant ratio corresponding to an excess of acid (0.25N) and a silica concentration of 18.5% w/w.

The silica hydrosol was allowed to set to a hydrogel then broken down into manageable lumps and washed with water at 60° C. until the effluent pH was 3.0. The derived vacuum dried product had a surface area S(BET) of about 800 $m^2g^{-1}$. Silica hydrogels with lower surface areas can be prepared from this base feedstock by washing to higher pH, for example pH 6.3 yields a product with a surface area S(BET) of 550 $m^2g^{-1}$.

The washed silica hydrogel product was then milled to the required particle size and size distribution using a hammer classifier mill.

EXAMPLE 1

A number of potential materials suitable for use in beverages were screened for their ability to produce the required filtration characteristics when blended with milled silica hydrogels having permeabilities in the range 0.2 to 0.3 Darcies, they included:
 (i) Fibroxcel (tradename)—a cellulose, Perlite and kieselguhr blend obtainable from AEB spa of Brescia, Italy.
 (ii) Fillite (registered trademark)—a silica alumina obtainable from Fillite Ltd of Runcorn, Engalnd.
 (iii) Expancel (tradename)—a copolymer of vinylidene chloride/acrylonitrile obtainable from Expancel of Sundsvall, Sweden.
 (iv) Cellulose (powders and fibers)

In order to screen the candidate materials 70:30 blends were prepared of the body feed grade milled hydrogel and the additive in a Kenwood Chef mixer. The milled hydrogel had a particle size of 17.2 um, silica content of 33.2% w/w, and a surface area S(BET) of 780 $m^2g^{-1}$. Each of the blends was subjected to the following measurements:
 (i) Permeability
 (ii) Cake Density
 (iii) Perspex Abrasion Value The results of these selection tests are summarised in Table 1. Clearly, Fillite and Expancel are not fulfilling the requirements for the additive since the blends with the milled silica hydrogel have lower permeabilities than the original milled hyrogel product.

The other two candidate materials produce a blended product with the required attributes, but only the blend containing cellulose fiber materials are deemed to be non-abrasive.

Fibroxcel 10 is a blended product containing cellulose fiber, Perlite, and possibly Kieselguhr and has a perspex abrasion value of 70, compared to the milled silica hydrogel product which on the same scale has an abrasion value of 6.

EXAMPLE II

Following the procedure for the preparation of the blends described in Example I a range of alpha-cellulose products were vetted as possible additives to the milled silica hydrogel, they included:
 (i) Diacel 750 and 800 obtainable from CFF of Mönchengladbach, Germany;
 (ii) Hahnflock HI0, H40 and HC222 obtainable from Johnson, Jörgensen & Wettre Ltd of Wokingham, Berkshire, England;
 (iii) Solkafloc KS 1016 obtainable from Johnson, Jörgensen & Wettre Ltd of Wokingham, Berkshire, England;
 (iv) Arbocel B800 and BWW40 obtainable from J. Rettenmaier u. Söhne, Fülstoff-Fabriken, W. Germany.

The milled silica hydrogel product used in the example has an average particle size of 18.2 um, a silica content of 33.8% w/w, and a surface area S(BET) of 820 $m^2g^{-1}$.

The blended products were prepared with alpha-cellulose compositions varying from 30 to 70% w/w and each blend was subjected to the selection test procedure.

The results listed in Table II show that only alpha-cellulose products having a packed bed permeability in the range 1.0 to 1.3 Darcies give blended products with the required filtration characteristics. Cellulose products having high permeabilities in excess of 1.5 Darcies, which should give a range of blended products with high permeabilities, surprisingly lower the filtration properties to an unacceptable level (below 0.5 Darcies) even in blended products containing 30% of the cellulose fiber product.

EXAMPLE III

In the examples given above it has been demonstrated that an effective precoat with the required filtration properties can be prepared by blending alpha-cellulose fiber products (permeability range 1.0 to 1.3 Darcies) with a milled silica hydrogel (permeability range 0.2 to 0.3 Darcies). To provide sufficient material for brewery trials and to determine the feasibility of producing suitable material by co-milling the alpha-cellulose fiber product with silica hydrogel a number of trials were conducted using a hammer/classifier mill.

The washed silica hydrogel product had a pH of 3.0 and a surface area S(BET) of 850 $m^2g^{-1}$. Diacel 750 was chosen as a suitable alpha-cellulose product.

According to the material balance a series of blended products was produced varying the alpha-cellulose content from 20 to 45% w/w. Each blend was then subjected to the selection test procedure and the results are given in Table III.

Clearly, blended materials with the required filtration characteristics can be prepared by co-milling silica hydrogel with the alpha-cellulose product.

EXAMPLE IV

In the examples given above it has been shown that suitable blended products with the required filtration properties can be prepared by either mixing the milled silica hydrogel with the alpha-cellulose product or by co-milling the base silica hydrogel with the alpha-cellulose fiber.

The blended product from Example III, Table III, Run 3 containing 35% w/w of Diacel 750 was used as the precoat in a filtration trial to demonstrate the applicability of the product in the total hydrogel filtration system for alcoholic beverages.

A standard Stella Meta Candle Filter, Type 80 was first conditioned with the blended precoat at a loading of 10 kg. Keg lager grade beer dosed with body feed, Lucilite (regd. tradename) PC6 (a silica hydrogel), at a level 80 g/Hl and at a controlled temperature of 0° to 1° C. was passed through the filter. Lucilite PC6 is obtainable from ABM Ltd of Stockport, England.

Over a period of 7 hours approximately 324 Hl of filtered beer was produced with both the required clarity and the level of stabilisation to provide the commercial benefit of a longer shelf-life beer.

The maximum rise in differential pressure recorded was of the order of 4 p.s.i.

The results of the trial are given in Table IV.

EXAMPLE V

The blend product from Example III Table III run 3 (containing 35% w/w of Diacel 750) was precoated onto a plate and frame filter (24.5 sqm) at a level of 1.0 Kg/m. Keg lager grade beer dosed with a body feed of Lucilite PC6 at a level of 100g/Hl was passed through the filter at a controlled temperature of 0° C. A total of 377 Hl of beer was treated over 4½ hours and Table V shows the beer obtained had the desired clarity and stabilisation. The beer had a shelf life equivalent to 9 months.

EXAMPLE VI

The blend product from Example III Table III Run 3 (containing 35% w/w of Diacel 750) was slurried in water with Kieselguhr to form a pre-coat mix having the composition:

Kieselguhr 15 kg
Blend product 22½ Kg

The slurry was applied to a 60 m² filtration area candle filter in a filtration trial to demonstrate the applicability of the product as a partial replacement of Perlite/Kieselguhr where the system is used for the filtration of alcoholic beverages.

A Filtro-Star Candle Filter, having 294 candles and a filtration area of 60 m², was pre-coated with the slurry. A second pre-coat consisting entirely of Kieselguhr (33 kg) was applied before filtration of beer commenced.

The beer was dosed with a body-feed blend of Lucilite PC6 and Kieselguhr such that the dosage rate was:
Lucilite PC6 25 g.Hl$^{-1}$
Kieselguhr 20 g.Hl$^{-1}$ The filtration temperature was controlled at 0° C. Three beer qualities were filtered, two ales and one lager. Over a period of 5½ hours approximately 2,000 Hl of filtered beer was produced with the required shelf-life and clarity.

The rate of increase in differential pressure during this trial was 0.6 bar per hour to a final pressure of 3.4 bar, i.e. similar to normal processing with an all Kieselguhr pre-coat. The results of the trial are given in Table VI.

It is common practice in brewery trials to use one filter loading and test its utility with a range of beers. After 2½ hours the grade of ale was changed and after 3½ hours total lager was processed.

TABLE I

| PRODUCT | PERMEABILITY DARCIES | CAKE DENSITY KG/L | ABRASION VALUE |
|---|---|---|---|
| 30% FIBROXCEL 10/ 70% MILLED HYDROGEL | 0.94 | 0.26 | 55 |
| 30% FILLITE/ 70% MILLED HYDROGEL | 0.20 | NM | NM |
| 30% EXPANCEL/ 70% MILLED HYDROGEL | 0.22 | NM | NM |
| 30% HAHNFLOC H40/ 70% MILLED HYDROGEL | 0.28 | 0.50 | 5 |
| 30% DIACEL 750/ 70% MILLED HYDROGEL | 0.58 | 0.46 | 3 |
| CLARCEL FLO-2 | 0.53 | 0.25 | 63 |
| HIFLO SUPERCEL | 0.63 | 0.34 | 59 |
| DICALITE SPEEDPLUS | 0.54 | 0.32 | 66 |

NM - not measured
CLARCEL FLO-2 (perlite) is obtainable from British CECA Ltd of London, England
HIFLO SUPERCEL (Kieselguhr) is obtainable from Manville Corp of Denver, USA
DICALITE SPEED PLUS (Kieselguhr) is obtainable from Grefco of Colorado, USA

TABLE II

| PRODUCT | PERMEABILITY DARCIES | CAKE DENSITY KG/L | ABRASION VALUE |
|---|---|---|---|
| HAHNFLOCK H40 | 1.68 | 0.17 | 6 |
| 30:70 BLEND | 0.31 | 0.51 | 5 |
| 70:30 BLEND | 0.71 | 0.34 | 4 |
| HAHNFLOC H10 | 1.5 | 0.21 | 6 |
| 30:70 BLEND | 0.39 | 0.45 | 4 |
| SOLKAFLOC KS 1016 | 2.03 | 0.21 | 5 |
| 30:70 BLEND | 0.39 | 0.45 | 5 |
| DIACEL 750 | 1.20 | 0.23 | 2 |
| 30:70 BLEND | 0.56 | 0.45 | — |
| 60:40 BLEND | 0.88 | 0.33 | 2 |
| ARBOCEL B 800 | 1.16 | 0.24 | 3 |

TABLE II-continued

| PRODUCT | PERMEABILITY DARCIES | CAKE DENSITY KG/L | ABRASION VALUE |
|---|---|---|---|
| 30:70 BLEND | 0.61 | 0.48 | — |
| 70:30 BLEND | 0.94 | 0.35 | 3 |
| HAHNFLOCK HC222 | 0.76 | 0.28 | 6 |
| 30:70 BLEND | 0.33 | 0.45 | — |
| 70:30 BLEND | 0.44 | 0.39 | — |
| ARBOCEL BWW 40 | — | — | — |
| 30:70 BLEND | 0.58 | 0.46 | 4 |
| 70:30 BLEND | 0.85 | 0.39 | — |

TABLE III

| RUN | PRODUCT | PRODUCTION RATE KG/HR | PERMEABILITY DARCIES | CAKE DENSITY KG/L |
|---|---|---|---|---|
| 1 | MILLED HYDROGEL (a) | 40–45 | 0.22 | 0.62 |
| 2 | 20% DIACEL 750 | 45–50 | 0.40 | 0.53 |
| 3 | 35% DIACEL 750 | 45–52 | 0.55 | 0.48 |
| 4 | 45% DIACEL 750 | 40–48 | 0.88 | 0.34 |

(a) THE AVERAGE PARTICLE SIZE VARIED FROM 16.8 TO 18.5 MICRON THE SILICA CONTENT FROM 32.5 TO 33.8%.

TABLE IV

| Time | DP (psi) | Filtration Rate (Hl/hr) | Clarity (EBC units) |
|---|---|---|---|
| 0 | — | — | — |
| 1 h | 2 | 64 | 0.62 |
| 2 h | 3 | 64 | 0.40 |
| 3 h | 4 | 64 | 0.32 |
| 4 h | 4 | 64 | 0.30 |
| 5 h | 5 | 64 | 0.32 |
| 6 h | 5 | 64 | 0.32 |
| 7 h | 6 | NM | 0 30 |

Volume of beer filtered - 328 Hl.
Shelf life - equivalent to 6 months
EBC units are European Brewing Convention units.

TABLE V

| Time | DP (psi) | Filtration Rate Rate (Hl/hr) | Clarity (EBC units) |
|---|---|---|---|
| 0 | 2 | — | — |
| 1 h | 3 | 79 | 0.55 |
| 2 h | 6 | 82 | 0.50 |
| 3 h | 7 | 82 | 0.48 |
| 4 h | 9 | 82 | 0.50 |
| 4½ h | 10 | 82 | 0.48 |

TABLE VI

| Time | DP (psi) | Filtration Rate Rate (Hl/hr) | Clarity (EBC units) |
|---|---|---|---|
| 0 | 13.5 | 400 | — |
| 1 h | 28.5 | 390 | 0.35 |
| 2 h | 36.0 | 400 | 0.35 |
| 3 h | 44.2 | 370 | 0.58 |
| 4 h | 48.8 | 330 | 0.57 |
| 5 h | 71.2 | 350 | 0.57 |
| 5½ h | 65.2 | 315 | — |

Volume of beer filtered 2,030 hecotliters.

We claim:

1. A blend for precoating alcoholic beverage filters comprising silica hydrogel having a particle size distribution which provides a packed bed with a permeability from about 0.1, to about 0.3 Darcies blended with from about 25% to about 75%, by weight of alpha cellulose fiber having a packed porosity equivalent to a permeability from about 1.0 to 1.3 Darcies, the blended product having a permeability above 0.5 Darcies and a perspex abrasion value not above 10.

2. A hydrogel/cellulose blend according to claim 1 having a filter cake density in the range from about 0.3 to about 0.6 Kg/liter.

3. A hydrogel/cellulose blend according to claim 1 or 2 wherein the hydrogel has a surface area (BET) from about 200 to about 1100m$^2$/g.

4. A hydrogel/cellulose blend according to claim 1, 2 or 3 wherein the silica content of the hydrogel is from about 25 to about 45% by weight.

5. A blend according to claim 4 wherein the packed bed has a permeability of from about 0.2 to about 0.3 Darcies; the silica hydrogel is blended with from about 30% to about 50% by weight of alpha cellulose fiber; the filter cake density is in the range of about 0.4 to about 0.6 kg/liter and the silica content of the hydrogel is about 30% to about 38% by weight.

6. A hydrogel/cellulose blend according to any preceding claim wherein the components are comilled.

7. A filter coated with an effective amount of the hydrogel/cellulose blend of any preceding claim.

8. A method of treating fermented alcoholic beverages wherein the beverage, after treatment with a stabilising agent, is passed through a filter coated with an effective amount of the hydrogel/cellulose blend of any of claims 1 to 6.

* * * * *